United States Patent [19]

Bast et al.

[11] Patent Number: 5,372,391
[45] Date of Patent: Dec. 13, 1994

[54] INTERNAL PIPE ATTACHMENT MECHANISM

[75] Inventors: Richard M. Bast, Livermore; Dwayne A. Chesnut, Pleasanton; Carl D. Henning, Livermore; Joseph P. Lennon, Livermore; John W. Pastrnak, Livermore; Joseph A. Smith, Livermore, all of Calif.

[73] Assignee: The United States of America as represented by the United States Department of Energy, Washington, D.C.

[21] Appl. No.: 20,925

[22] Filed: Feb. 22, 1993

[51] Int. Cl.$^5$ .................................................. F16L 37/08
[52] U.S. Cl. .................................. 285/319; 285/307; 285/346; 285/15
[58] Field of Search ................ 285/319, 15, 307, 311, 285/345, 346, 370

[56] References Cited

U.S. PATENT DOCUMENTS

| Re. 30,802 | 11/1981 | Rogers, Jr. | 29/421 |
|---|---|---|---|
| 115,917 | 6/1871 | Wharton | 285/319 |
| 737,357 | 8/1903 | Crump et al. | 285/319 |
| 2,099,984 | 11/1937 | Lundquist | 285/319 |
| 2,360,485 | 10/1944 | Foster | 285/319 |
| 3,148,894 | 9/1964 | Schwab | 285/319 |
| 3,245,703 | 4/1966 | Manly | 285/319 |
| 3,773,260 | 11/1973 | Timbers | 285/307 |
| 3,781,966 | 1/1974 | Lieberman | 29/401 |
| 3,826,523 | 7/1974 | Eschbaugh | 285/319 |
| 4,307,902 | 12/1981 | Schnatzmeyer | 285/319 |
| 4,485,847 | 12/1984 | Wentzell | 138/89 |
| 4,581,801 | 4/1985 | Kobuck et al. | 29/157.4 |
| 4,610,468 | 9/1986 | Wood | 285/307 |
| 4,648,626 | 3/1987 | Vinciguerra et al. | 285/15 |
| 4,713,870 | 12/1987 | Szalvary | 29/402.09 |
| 4,749,214 | 6/1988 | Hoskins | 285/319 |
| 4,793,382 | 12/1988 | Szalvay | 138/98 |
| 4,941,512 | 7/1990 | McParland | 138/97 |
| 4,960,650 | 10/1990 | Vigneron et al. | 428/594 |
| 5,009,002 | 4/1991 | Kelly | 29/890.031 |
| 5,034,187 | 10/1991 | Sigel | 29/507 |

FOREIGN PATENT DOCUMENTS 2-209691 8/1990 Japan .................................. 285/319

Primary Examiner—Eric K. Nicholson
Attorney, Agent, or Firm—Henry Sartorio; Roger S. Gaither; William R. Moser

[57] ABSTRACT

An attachment mechanism for repairing or extending fluid carrying pipes, casings, conduits, etc. utilizing one-way motion of spring tempered fingers to provide a mechanical connection between the attachment mechanism and the pipe. The spring tempered fingers flex to permit insertion into a pipe to a desired insertion depth. The mechanical connection is accomplished by reversing the insertion motion and the mechanical leverage in the fingers forces them outwardly against the inner wall of the pipe. A seal is generated by crushing a sealing assembly by the action of setting the mechanical connection.

20 Claims, 5 Drawing Sheets

INTERNAL PIPE ATTACHMENT MECHANISM

The United States Government has rights in this invention pursuant to Contract No. W-7405-ENG-48 between the United States Department of Energy and the University of California for the operation of Lawrence Livermore National Laboratory.

BACKGROUND OF THE INVENTION

This invention relates to means for repairing or extending fluid carrying members, particularly to an attachment insertable into such a fluid carrying member, and more particularly to an internal pipe attachment mechanism utilizing spring tempered fingers and a seal assembly for repairing or extending fluid carrying members.

Fluid carrying members, such as pipes, casings, conduits, lines, used in transporting fluids such as natural gas, oil, water, steam, heat exchanges, etc. become damaged by various means, and repair of such becomes necessary. Besides corrosion of the fluid carrying members, they are damaged by being struck by construction equipment, etc., or by sabotage, such as by explosives used in the Kuwait oil fields. Also, it becomes necessary in some instances to extend such fluid carrying members, or replace an end piece, such as a flange, with a coupling or other end piece component.

Substantial effort has been directed to developing devices and methods for repairing fluid carrying members which stop leakage, such as caused by corrosion, and provide sealing about the repaired section. These prior approaches provide for mechanical connections and seals between the repair devices and the fluid carrying members which are implaced via explosive actuators, pyrotechnics, compressed air, hydraulic and mechanical means. These prior known repair and sealing approaches are exemplified by the following U.S. Pat. No. 3,781,966 issued Jan. 1, 1974 to I. Lieberman relating to a method of explosively expanding sleeves in eroded tubes; Re. U.S. Pat. No. 30,802 reissued Nov. 24, 1981 to G. D. Rogers, Jr. relating to a method of securing a sleeve within a tube using outward plastic deformation of the sleeve and the tube; U.S. Pat. No. 4,485,847 issued Dec. 4, 1984 to T. H. Wentzell relating to compression sleeve tube repair involving an assembly composed of three main components for compressing and expanding the sleeve; U.S. Pat. No. 4,581,801 issued Apr. 15, 1986 to R. M. Kobuch relating to a sleeving method using expander members to expand a sleeve inserted into a defective tube; U.S. Pat. No. 4,648,626 issued Mar. 10, 1987 to C. Vinciguerra et al. relating to a telescopic joint for repairing underwater pipelines using a cylinder-sheath-sleeve assembly; U.S. Pat. No. 4,713,870 issued Dec. 22, 1987 and U.S. Pat. No. 4,793,380 issued Dec. 27, 1988 to L. Szalvay relating to sleeve apparatus and method for repairing a damaged pipe wherein the sleeve is expanded by draw means against the inner surface of the pipe; U.S. Pat. No. 4,941,512 issued Jul. 17, 1990 to K. W. McParland relating to a method of repairing heat exchanger tube ends using an insert flared to the existing tube end; U.S. Pat. No. 4,960,650 issued Oct. 2, 1990 to G. Vigneron et al. relating to a method of repairing a metal tube in a heat exchanger using a sleeve which is welded to the inner surface of the damaged tube; U.S. Pat. No. 5,009,002 issued Apr. 23, 1991 to J. W. Kelly relating to a method for radially expanding and anchoring sleeves within tubes using hydraulic means; and U.S. Pat. No. 5,054,187 issued Oct. 8, 1991 to A. Sigel relating to a method and means for remote-controlled renovating of pipelines using a robot to install metal sheathing at the point of repair.

While these prior known methods and devices for repairing fluid carrying members provide satisfactory results, there exists a need for a method and means for quickly repairing fluid carrying members such as where the ends or connections to valves, distribution systems, etc. have been destroyed. This was exemplified by the Kuwait oil fields wherein control of the flow of oil and the extinguishing of oil fires required replacement of oil casing flanges, couplings, extensions to storage or distribution systems, etc. which had been destroyed.

The present invention fills that need by providing an internal pipe attachment mechanism wherein one end thereof is inserted into the damaged fluid carrying members, such as a pipe, casing, etc. and mechanically secured and sealed therein, while the other end includes a flange, coiling, etc. or a similar internal attachment mechanism for inserting into another pipe, etc. for extending the fluid carrying member. Thus, the present invention provides an attachment mechanism which can be rapidly installed in exposed ends of the fluid carrying members for repairing damaged member's or extending the length of such members.

SUMMARY OF THE INVENTION

It is an object of the present invention to provide an attachment mechanism for fluid carrying members.

It is a further object of the invention to provide an internally secured attachment mechanism for an end of a fluid carrying member.

A further object of the invention to provide an attachment mechanism which is internally mounted in an end of at least one fluid carrying member.

Another object of the invention is to provide an attachment mechanism which is secured at one end to an internal wall or surface of a fluid carrying member and provided at an opposite end with means, such as a flange or coupling for connecting to a point of use.

Another object of the invention is to provide an internal pipe attachment mechanism having spring tempered fingers for providing a mechanical connection to a pipe in which it is inserted.

Another object of the invention is to provide an internal pipe attachment mechanism which includes spring tempered fingers and a seal assembly, wherein activation of the spring tempered fingers produce a mechanical connection to an inner wall of a pipe in which it is inserted and causes crushing of the seal assembly to produce a seal with the inner wall of the pipe.

Still another object of the invention is to provide means for repairing and/or interconnecting fluid carrying members without requiring additional components for installation.

Other objects and advantages of the invention will become apparent from the following description and accompanying drawing. It is to be understood that the term fluid carrying member, described hereinafter as a pipe or casing, includes casings, pipes, conduits, lines, tubes, etc. which are capable of carrying or transporting a fluid in either liquid or gaseous form. Also, while the description of the invention is set forth hereinafter in an application for use in oil well casings and pipes, such is not intended to limit its use, as the invention can be utilized in heat exchangers, pipelines, water systems, natural gas systems, refinery systems, etc. involving either liquid or gaseous materials.

The objects and advantages of the present invention are accomplished by a mechanism having means at one end for securing the mechanism to an inner surface of a pipe or casing, and provided at the other end with means such as a flange or coupling, or with means for securing the mechanism to another pipe or casing. Thus, the attachment mechanism of this invention can be utilized for either repair of a damaged pipe or casing, or for an extension of either a damaged or undamaged pipe or casing.

The primary features of the attachment mechanism of this invention involve the use of fingers of spring tempered steel and a seal assembly, wherein movement of the spring tempered steel fingers to create a mechanical connection to an inner surface or wall of a pipe in which the mechanism is inserted also crushes the seal assembly to produce a seal between the attachment mechanism and the inner surface or wall of the pipe. The spring tempered fingers are designed to flex and permit insertion in an end of a pipe to a desired insertion depth. When the insertion motion is reversed the mechanical leverage in the fingers forces them outwardly against the inner wall of the pipe forming a mechanical and friction based joint. The seal is generated by crushing the seal assembly by the action of setting the mechanical connection between the spring tempered fingers and the pipe inner wall. The mechanical connection is maintained by the force of the natural oil well pressure or other pressure source, and/or a continued application of the reversed insertion force via the attachment being secured to a point of use, such as a pump, valve, or distribution or storage pipeline.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention is directed to an attachment mechanism adapted to be mounted in an end of a fluid carrying member, such as an oil well casing or pipe, for repair of, or extension to, the casing or pipe. The attachment mechanism of this invention utilizes spring tempered fingers to provide a mechanical connection to an inner wall of a casing or pipe in which it is inserted, and includes a seal assembly which is crushed by the setting of the mechanical connection to form a seal between the attachment mechanism and the pipe inner wall. The attachment mechanism may be provided at an end opposite the inserted end with means such as a flange, coupling, etc. for connection to a pipe, valve, pump, etc., or with another set of spring tempered fingers and seal assembly for attachment to another pipe or casing. Thus, the present invention functions to repair damaged casings or pipes, or provides a means for extending casings or pipes and/or connecting one end of a casing or pipe to an end of another casing or pipe. The attachment mechanism of this invention is quickly installed and requires no additional components for installation to either damaged or undamaged pipes or casings.

Basically, a damaged oil well casing having an end destroyed, for example, may be repaired and/or extended by mechanically connecting thereto a tube or hollow member having spring tempered fingers at one end inserted into the damaged casing, and the other end of the inserted tube having a desired flange or coupling thereon, for example, whereby the oil well casing can be connected to a valve, pump, or pipeline. The mechanical connection between the oil well casing and the attachment tube is the result of the action of a one-way motion of the spring tempered fingers. The fingers are designed to flex and permit insertion into the damaged casing to a desired insertion depth. The mechanical connection is completed when the insertion motion is reversed and the mechanical leverage as the fingers forces them outward against the inner wall of the casing, forming a mechanical and friction based joint. The mechanical connection is maintained by the action of the natural well pressure and/or a continued application of the reversal force on the fingers of the attachment, such as by connecting the attachment to a point of use (valve, pump, etc.).

To prevent leakage around the inserted tube of the attachment, a sealant containing seal assembly is provided and inserted with the spring tempered fingers into the damaged casing. A seal between the casing and the tube is generated by crushing the seal assembly by the action of the spring tempered fingers in setting the mechanical connection with the casing causing the sealant to be forced between the inserted tube and the inner wall of the casing.

Figure 1:
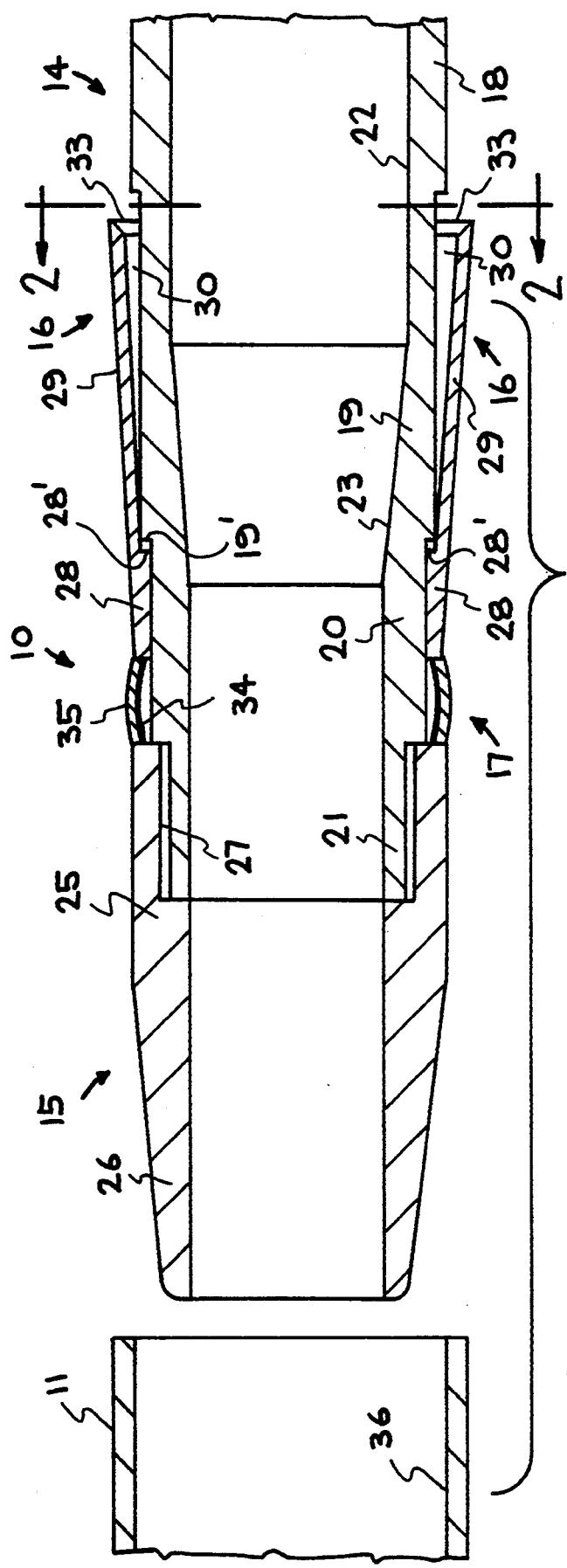
FIG. 1 illustrates partial cross-sectional view of an embodiment of the attachment mechanism made in accordance with the invention and positioned adjacent to an end of a pipe into which it is to be inserted.
Figure 3A:
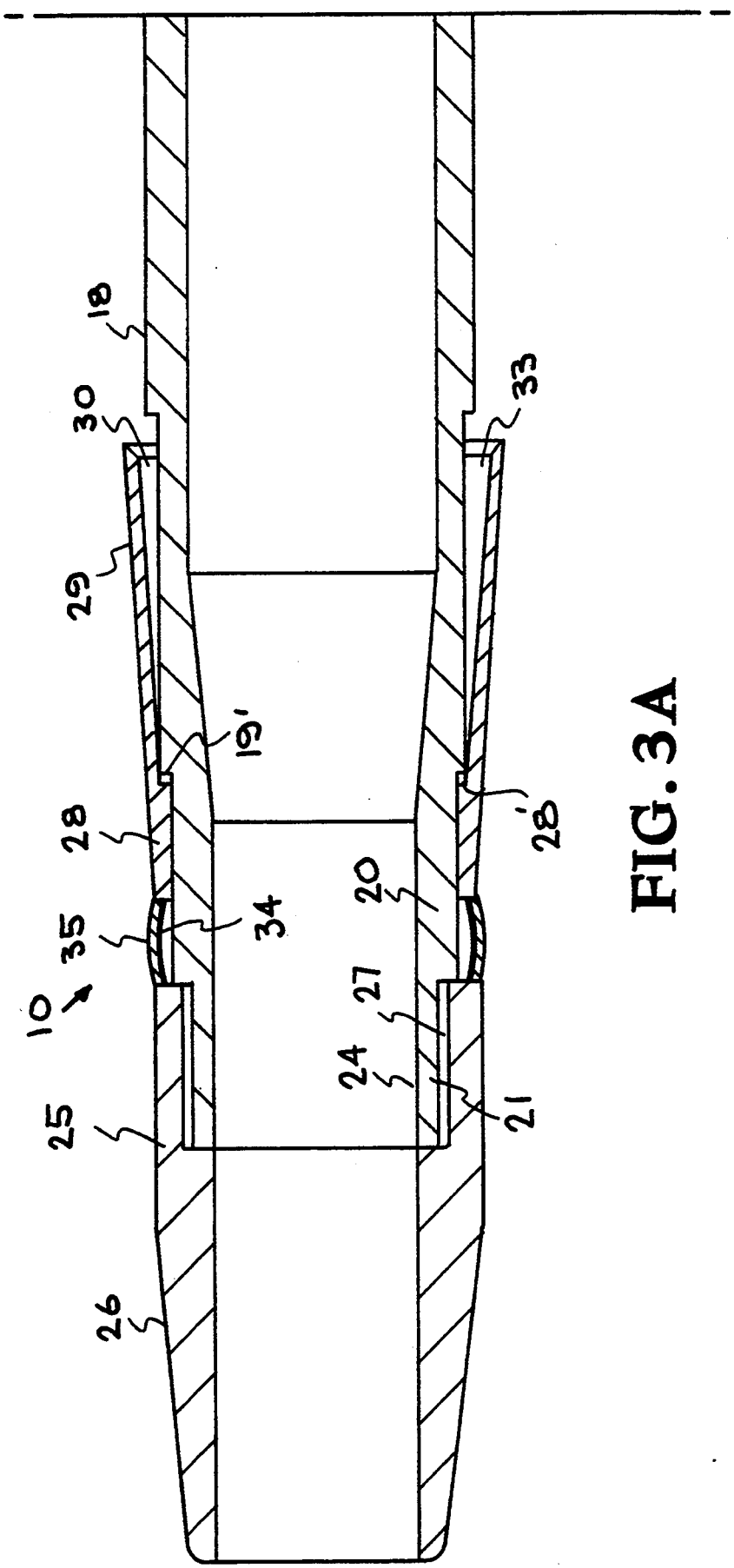
FIG. 3A–3B is a partial cross-sectional view of another embodiment of the attachment mechanism of invention for interconnecting pipes using two back-to-back attachment mechanisms of the FIG. 1 embodiment.
Figure 3B:
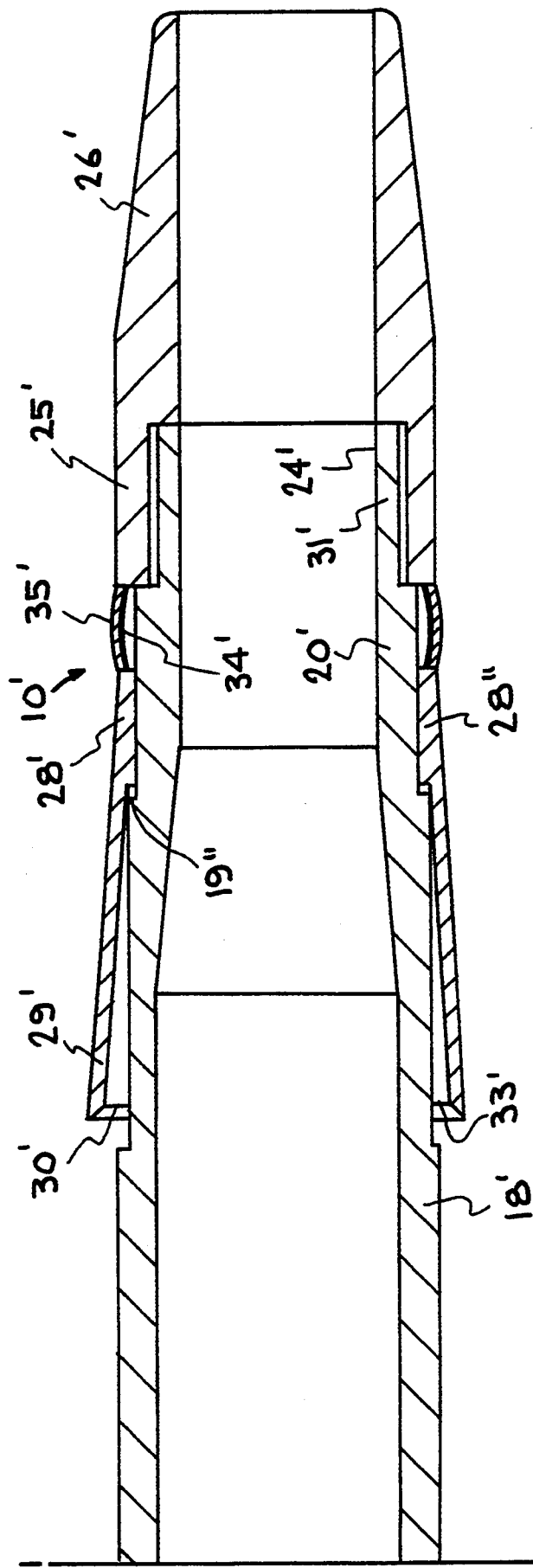
Figure 5:
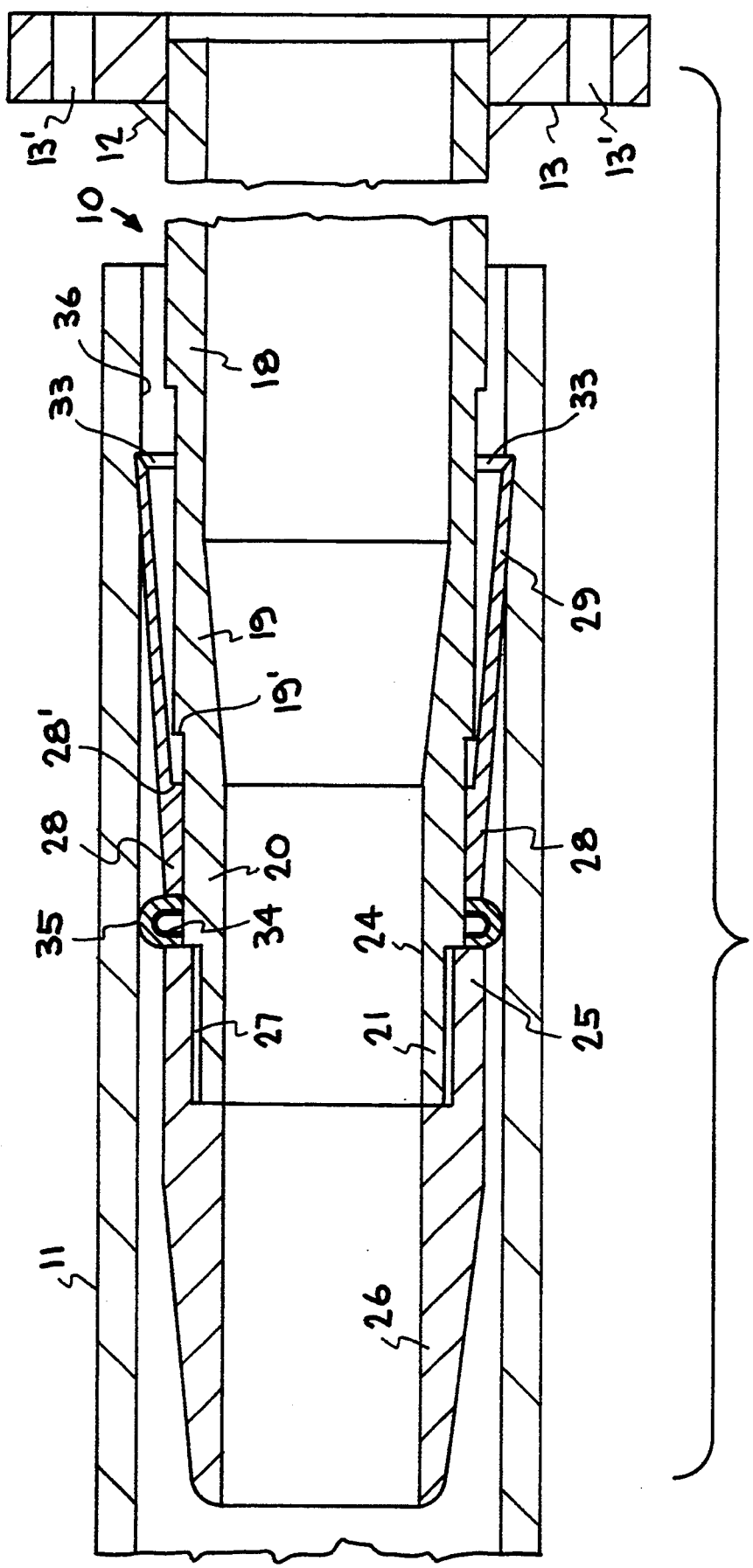
FIG. 5 illustrates in partial cross-section the FIG. 1 attachment mechanism installed in the pipe with the seal assembly shown in the place against the wall of the pipe.

Referring now to the drawings, FIG. 1 illustrates an embodiment of the attachment or attaching mechanism of the invention generally indicated at 10 which is to be secured in and sealed to a pipe 11. The depth of insertion of the attachment mechanism 10 into pipe 11 will be dependent upon the specific application, e.g. repair of a damaged end of the pipe for replacing a coupling, flange, etc., or for extending the length of the pipe, and such will depend on the type of end piece attached to the attachment mechanism 10. If for example, it is desired to interconnect two sections of pipe 11, the attachment mechanism 10 of FIG. 1 could be embodied as shown in FIGS. 3A and 3B, wherein back-to-back attachment mechanisms 10 and 10' are used. If it is desired to connect a damaged pipe 11 to a point of use such as valve, pump, coupling, pipeline, etc., the attachment mechanism 10 of FIG. 1 could be embodied as shown in FIG. 5, wherein the attachment mechanism 10 is secured such as by a weld 12 to a flange 13 to be bolted via openings 13' or otherwise secured to the valve, pump, etc. It is readily seen that the attachment mechanism 10 could be secured to other types of end pieces, depending of the specific application therefor.

Figure 2:
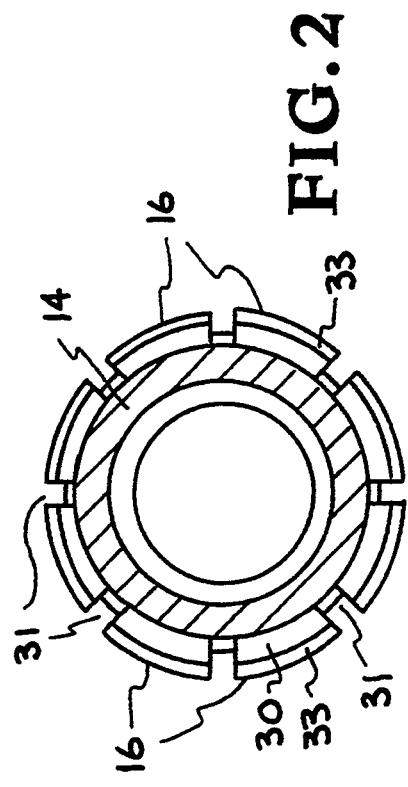
FIG. 2 is a view taken along line 2—2 of the FIG. 1 attachment mechanism.

The attachment mechanism 10 generally comprises, as seen in FIGS. 1 and 2, a pair of interconnected tubular members 14 and 15, a tubular member forming plurality of spring tempered fingers or members 16 (eight shown for simplicity) located around tubular member 14, and a seal assembly generally indicated at 17 positioned around tubular member 14 and intermediate tubular member 15 and fingers or members 16. Tubular member 14 includes four (4) sections 18, 19, 20 and 21 of different external diameter or cross section with three (3) sections 22, 23 and 24 of different internal diameter or cross-section, with internal diameter section 23 being tapered to interconnect internal diameter sections 22 and 23, but need not be so tapered. Tubular member 15 includes two (2) sections 25 and 26 of different external diameter or cross-section, with section 26 being tapered, and an internal diameter or cross-section which is the same and the internal diameter 24 of tubular member 14. Section 26 need not be tapered, but of a diameter less than section 25. Also, tubular member 15 includes an internal threaded cut-away section 27 in section 25 thereof having an internal cross-section and length which is slightly larger than the cross-section and length of external threaded section 21 of tubular member 14, such that tubular section 21 is secured within cut-away section 27 of tubular member 15, by threads.

The spring tempered fingers or members 16 are constructed from a tubular section 28 extending around and positioned in contact with tubular section 20 of tubular member 14 and an outwardly extending or flared section 29 which extends outwardly along tubular section 19 of tubular member 14 (see FIG. 1). Note that the end of section 29 adjacent section 28 is in contact with the end of tubular section 19 which is adjacent tubular section 20 and extends radially outward so as to be in spaced relation, indicated at 30, with the end of tubular section 19 which is adjacent tubular section 18. Section 29 is slit in eight (8) sub-sections so as to define the eight (8) fingers 16 which have a space 31 intermediate each of the fingers or members 16 at the outer or rear-ward end thereof as seen in FIG. 2. Sections 28 and 29 of fingers 16 are interconnected by a land or raised surface 28'. Section 28 of each of the fingers or members 16 is mounted about tubular section 20 of tubular member 14, such that land 28' of finger 16 is in contact with a land or raised surface 19' intermediate at tubular sections 19 and 20. The outer or rear-ward ends 33 of curved sections 29 of fingers 16 define an outer diameter or cross-section slightly greater than the internal cross-section of pipe 11, for example, into which the attachment mechanism 10 is to be inserted, such that the ends 33 of sections 29 of the fingers 16 have to flex or compress inwardly toward tubular section 19 of tubular member 14 when inserted into pipe 11. The number of spring tempered fingers or members 16, the curvature thereof, and the width of space 31 there between will vary with the size of the attachment mechanism 10 and the pipe 11 into which it is to be inserted. If desired, under certain applications the curvature at the outer end of fingers 16 can be omitted. While the embodiment of FIGS. 1 and 2 illustrate eight (8) fingers or members 16 for simplicity of illustration, such is not intended to be a limitation, since the width and curvature of the fingers, the strength of the material of which they are constructed, and the necessary pressure thereof on the internal surface of a pipe into which they are inserted are determining factors as to the number and/or width/curvature of the fingers 16 and width of space 31 there between. The outer edge ends 33 of fingers 16 define a sharp edge which is adapted to contact the inner surface of pipe 11 to provide mechanical/frictional force to prevent the attachment mechanism 10 from being easily withdrawn from pipe 11. Depending on the applications for the attachment mechanism 10 and the number, width/curvature, and construction of the fingers or members 16, each of the fingers may be tapered as to width and/or thickness from the inner or forward end (secured to tubular member 20) to the outer or rear-ward end 33. The spaces 30 and 31 must be of sufficient width to allow the outer ends 33 of fingers 16 to compress or flex inwardly and toward each other so as to allow same to enter a pipe into which attachment mechanism 10 is being inserted. Also, the various external and internal diameter sections 18-27 of tubular members 14 and 15 may be varied depending on the applications involved.

The seal assembly 17, as shown in FIG. 1 extends around the end of tubular section 20 adjacent tubular section 21 of tubular member 14 and is located intermediate the inner or forward ends of sections 28 of spring tempered fingers or members 16 and tubular section 25 of tubular member 15. The seal assembly 17 comprises an inner metallic or non-metallic support layer 34 and an outer layer 35 of sealant material, such as Copper, Teflon, rubber, or Mylar with the inner layer 34 being constructed, for example, of iron, steel, aluminum, copper, silver or gold.

The seal assembly 17 has, as shown in FIG. 1, a slight curvature to provide for quicker and easier installation or setting thereof against an inner surface or wall 36 of pipe 11, as described hereinafter when attachment mechanism 10 is inserted into pipe 11. However, the seal assembly 17 need not have the curved configuration, and need not be of a layered construction as illustrated in FIG. 1.

The embodiment of FIG. 3A-3B is a back-to-back arrangement of the attachment mechanism 10 of FIG. 1 and a reverse identical attachment mechanism 10', each having similar reference numerals for corresponding components. The distance between the mechanisms 10 and 10' and thus the length of tubular section 18 interconnecting the mechanisms will depend of the specific use applications and the depth of insertion of the attachment mechanisms 10 and 10' into associated pipes, etc. The embodiment of FIG. 3A-3B may be used in various coupling or pipe extension applications requiring a quick interconnection between two pipes. The attachment mechanisms of FIG. 3A-3B will be inserted into associated pipes, etc., as is the FIG. 1 embodiment, described hereinafter with respect to FIGS. 4 and 5.

Figure 4:
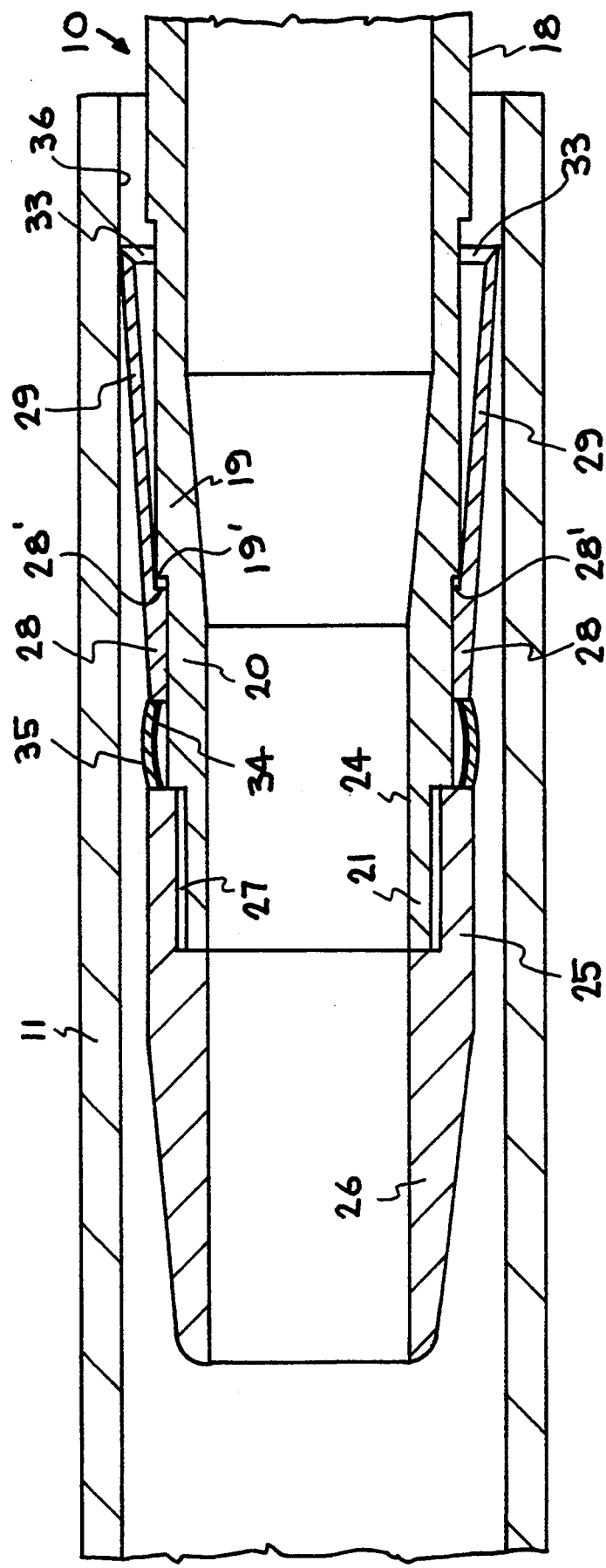
FIG. 4 illustrates in cross-section the attachment mechanism of FIG. 1 inserted into the pipe.

As shown in FIG. 4, the attachment mechanism 10 is inserted into an end of pipe 11 to a desired depth such that the spring tempered fingers or members 16 are sufficiently within the pipe 11 so as to be in a good mechanical/frictional connection with the inner wall or surface 36 of pipe 11. As the mechanism 10 is inserted into pipe 11, movement to the left as shown in FIG. 4, the outer ends 33 of fingers 16 are compressed or flexed inwardly and towards each other allowing the insertion of mechanism 10. As seen in FIGS. 1 and 4, fingers 16 move inwardly (to the left) with tubular member 14 due to the land or raised surface 19' interconnecting tubular sections 19 and 20. The mechanical connection results from the action of a one-way motion of spring tempered fingers 16 against the inner surface or wall 36 of pipe 11. The connection is completed when the insertion motion is reversed, movement to the right as shown in FIG. 5, and the mechanical leverage of the fingers 16 forces them outwardly against the inner wall or surface 36 of pipe 11. The outer edges of the outer ends 33 of fingers 16 tend to dig or cut into the material of the inner wall or surface 36 of pipe 11, producing a mechanical and friction based joint or connection there between. This connection is maintained by the action of the natural well pressure and/or a continued application of the withdrawal force, such as by connection of the attachment mechanism 10 to a pipe, etc. via the flange 13, illustrated in FIG. 5 for example. As the motion of insertion of the attachment mechanism 10 into pipe 11 is reversed to establish the mechanical/frictional connection with pipe 11 as described above, the seal assembly 17 is crushed and forced outwardly, as seen in FIG. 5, by this reverse motion of the tubular members 14 and 15 due to the reverse movement of the fingers 16 being stopped by their engagement with the inner wall 35. With movement of the fingers 16 stopped, the continued movement of tubular members 14 and 15 to the right, as shown, causes the fingers 16 to slide along tubular section 20 of tubular member 14, away from the land or raised surface 19' interconnecting tubular sections 19 and 20. This force, caused by movement to the right of tubular section 25 of tubular member 15, causes crushing of the seal assembly 17 such that it is bulged outwardly against the inner wall or surface 36 of pipe 11, as seen in FIG. 5. Note the gap in FIG. 5 between lands 19' and 28' and the increased gap between ends 33 and the tubular section 18 compared to FIG. 1. Thus, leakage of fluid flowing through pipe 11 is prevented from around attachment mechanism 10 by the crushed and bulged seal assembly 17.

The materials from which the components of attachment mechanism 10 are constructed from will be dependent on the environment in which the mechanism 10 is to be used, be it corrosive, acidic, etc. Also, the size (length and/or diameters) of the various components of mechanism 10 will also be varied depending on the size of the pipe, conduit, tube, etc. in which the mechanism 10 is to be inserted. By way of example, only, if the attachment mechanism 10 of FIG. 1 was to be inserted into a pipe 11, such as an oil well casing, with the inner wall or surface 36 having an internal diameter of either 3.5 inches or 8 inches, depending on the application involved, the tubular members 14 and 15 would be constructed of steel, fingers or members 16 would be constructed of spring steel or heat treated steel, and the seal assembly 17 would be composed of steel/copper. The external diameter sections 18, 19, 20 and 21 of tubular member 14 would have respective diameters of 3.25 to 3.375 inches for the 3.5 inch pipe, or cross-sections of 7¾ inches, 7¼ inches, 6⅞ inches and 6 inches for the 8 inch pipe, with the internal diameters 24, 23, and 25 being 2 inches for the 3.5 inch pipe or 5 inches, 5½ inches and 6⅛ inches, respectively for the 8 inch pipe. The external diameter of section 25 of tubular member 15 is 3.25 to 3.375 for the 3.5 inch pipe and 6½ inches for the 8 inch pipe with the section 26 having a taper of 3–10 degrees with a minimum external diameter of 3.25 to 3.375 for the 3.5 inch pipe or 5½ inches of 3.25 to 3.375 for the 3.5 inch pipe or while the internal diameter of sections 25 and 26 is 2 or 5 inches respectively, the same as the internal diameter 24 of section 21 of tubular member 14. The cutaway 27 in tubular section 25 has a clearance of 1/16 inch or one half the wall thickness and length of ¾ to 2 inches, which cooperate with section 21 of tubular member 14. FIGS. 16 may be 12–24 in number with each having an overall length of 2–5 inches and width of 0.6–1 inch and thickness of about 0.20 inch, with sections 28 and 29 having respective lengths of 1.5–2 inches, and with a curvature or outside diameter of the expanded fingers 16 being about 0.125 inch larger than the internal diameter of pipe 11, and the width of the gaps 31 being 0.04 inches. The seal assembly 17, when constructed of layers 34 and 35 as shown in FIG. 1 has a length between finger 16 and tubular section 25 of ¾ inch, with layer 34 being constructed of steel with a thickness of 0.03 inch and layer 35 being constructed of copper with a thickness of 0.06 inch. It is to be understood that the length of seal assembly 17 is such that when it is crushed it forms a fluid tight seal with inner wall 36 of pipe 11, and thus the length of the seal assembly will depend on the internal diameter of pipe 11 and the external diameter of tubular section 20 on which it is located. As seen in FIG. 5, the length of the crushed (implaced) seal assembly 17 is about one-half of the length thereof before crushing, as seen in FIG. 4.

While a specific set of parameters and materials have been set forth above as an example of the FIG. 1 attachment mechanism 10 inserted into a pipe 11 as shown in FIGS. 4 and 5, each of the mechanisms 10 and 10' of FIG. 3 may have different component parameters, depending on the size of the pipes, conduits, tubes, etc. into which they are to be inserted. Thus, the FIG. 3 embodiment, in addition to being a connector for a pair of pipes may serve as a reducer or expander for two interconnected pipes of different internal diameters. Also, while the attachment mechanism 10 has been illustrated and described as having a tubular or circular cross-section, the members 14 and 15 need not be of a tubular configuration.

While particular embodiments incorporating the attachment mechanism of the present invention have been described and/or illustrated, and particular uses or applications for this mechanism have been set forth, such is not intended to limit the invention to the particular embodiments, parameters, uses, etc., since modifications and changes will become apparent to those skilled in the art. The scope of the invention is to be limited only by the scope of the appended claims.

We claim:

1. A mechanism for attachment in an end of a member, comprising:
    at least one hollow member;
    a plurality of spring tempered members mounted about said hollow member, each of said spring tempered members being constructed and mounted such that one end thereof is movably mounted in contact with a first section of said hollow member and an opposite end thereof is in spaced relation with another section of said hollow member, an outer edge of said opposite end of each of said spring tempered members being adapted to contact an inner surface of an associated hollow member;
    a sealing means located around said hollow member adjacent to said one end of said spring tempered members;
    said hollow member including means for forcing said sealing means outwardly against an inner surface of an associated hollow member.

2. The mechanism of claim 1, wherein said hollow member comprises of a plurality of hollow members interconnected end to end, said plurality of spring tempered members and said sealing means being mounted on an exterior surface of one of said plurality of interconnected members, with said sealing means being located adjacent to another of said plurality of interconnected members.

3. The mechanism of claim 2, wherein said plurality of spring tempered members are mounted around said hollow member.

4. The mechanism of claim 3, wherein said sealing means is positioned intermediate said one end of said plurality of spring tempered members and one section of said another of said plurality of interconnected members.

5. The mechanism of claim 4, wherein each of said spring tempered members have a configuration which corresponds to a section of an outer surface of said hollow member on which the spring tempered members are mounted.

6. The mechanism of claim 2, wherein said plurality of interconnected hollow members consists of a pair of interconnected tubular members, one of said tubular members including at least two sections of different external diameters, said one end of each said plurality of spring tempered members being mounted about one of said two sections of said one tubular member and the opposite end of each of said plurality of spring tempered members being in spaced relation with a portion of another of said two sections of said one tubular member.

7. The mechanism of claim 6, wherein said two different diameter sections of said one tubular member are interconnected by a surface, and wherein each said plurality of spring tempered members include a surface which is in contact with said one of said two sections of said one tubular member and in contact with said interconnecting surface.

8. The mechanism of claim 7, wherein another of said pair of interconnected tubular members having a section thereof with a diameter greater than the diameter of said one section of said one tubular member and positioned adjacent said one section of said one tubular member, said sealing members being located intermediate said section of said another of said pair of tubular members and said one end of each of said spring tempered members.

9. The mechanism of claim 8, additionally including means for retaining said one end of each of said plurality of spring tempered members in movable contact with said one section of said one tubular member.

10. An attachment for pipes and the like, comprising:
a pair of tubular members interconnected end to end;
a plurality of spring tempered members movably mounted about a first section of a first of said pair of interconnected tubular members and extending so as to be in spaced relation with a second section of said first of said tubular members;
means for retaining said plurality of spring tempered members about said first section of said first of said tubular members; and
seal means positioned about said first section of said first of said tubular members and located intermediate said plurality of spring tempered members and a second of said pair of interconnected tubular members;
whereby upon insertion of the attachment mechanism into an end of a pipe, said plurality of spring tempered members provide a mechanical and frictional connection with an inner surface of a pipe, and said sealing means is forced outwardly forming a seal between said tubular members and an inner surface of a pipe.

11. The attachment mechanism of claim 10, wherein said first of said pair of tubular members includes at least three sections of different external diameter, a first of said three sections being connected to said second of said pair of tubular members, said seal means and said plurality of spring tempered members being positioned around a second of said three sections, and said spring tempered members extending along a first portion of a third of said three sections and being spaced from another portion of said third of said three section of said first of said pair of tubular members.

12. The attachment mechanism of claim 11, wherein said second of said pair of tubular members includes a section having an external diameter greater than at least said first and second sections of said first of said pair of tubular members, said section of said second tubular member having an internal cut-away into which said first section of said first tubular member is positioned and connected to, said sealing means being located intermediate said section of said second tubular member and said plurality of spring tempered members.

13. The attachment mechanism of claim 12, wherein said retaining means for said plurality of spring tempered members comprises a ring-like member extending around said spring tempered member, said ring-like member being constructed to allow movement of said spring tempered members along said second section of said first tubular member, whereby movement of said second tubular member with respect to said spring tempered members causes said sealing means to be forced against an inner surface of a pipe or the like into which said attachment mechanism is inserted.

14. The attachment mechanism of claim 13, wherein said sealing means comprises a seal assembly composed of a plurality of layers of different materials.

15. The attachment mechanism of claim 14, wherein said plurality of spring tempered members each comprises a finger-like member having a curvature which cooperates with a curvature of said first tubular member, said finger-like members being constructed and spaced with relation to one another and to a portion of said third section of said first tubular member to allow said finger-like members to compress and flex to allow insertion thereof into an end of a pipe or the like.

16. The attachment mechanism of claim 15, wherein said finger-like members each have ends which define an outer edge adapted to contact an inner surface of a pipe or the like into which said mechanism is inserted for providing said mechanical and frictional connection.

17. The attachment mechanism of claim 10, additionally including means secured to said first of said pair of interconnected tubular members for connecting the attachment mechanism to a point of use.

18. The attachment mechanism of claim 10, wherein said first of said pair of interconnected tubular members is connected in a back-to-back arrangement with a tubular member of a similarly constructed attachment mechanism.

19. An attachment mechanism for insertion into an end of a pipe for repairing, extending, interconnecting, reducing or expanding the pipe into which the mechanism is inserted, comprising:
a first tubular member having a plurality of sections of different external diameter;
a second tubular member having a plurality of sections of different external diameter;
said first and second tubular members being interconnected via the section of smallest external diameter of said first tubular member and the section of largest external diameter of said second tubular member;

a seal assembly positioned around the section of said first tubular member having the next to smallest external diameter and positioned adjacent the section of said second tubular member having the largest external diameter;

a plurality of finger-like members having one end thereof positioned around said section of said first tubular member having the next to smallest external diameter, said finger-like members extending along a section of said first tubular member having a third from smallest external diameter such that opposite ends of said finger-like members are in spaced relation with one another and with a portion of said section having the third from smallest external diameter;

and means for retaining said one end of said finger-like members around said section of said first tubular member having the next to smallest external diameter; and means connected to said first tubular member adapted to be connected to a point of use;

whereby with said attachment mechanism inserted into an end of an associated pipe, said opposite ends of said finger-like members create a mechanical and frictional connection with an inner surface of such an associated pipe, and said seal assembly is crushed by movement of said second tubular member with respect to said one end of said plurality of finger-like members creating a seal between the attachment mechanism and an inner surface of an associated pipe.

20. The attachment mechanism of claim 19, wherein each of said finger-like members are curved to conform to a curvature of said first tubular member.

* * * * *